United States Patent [19]

Bateman

[11] Patent Number: 5,062,704
[45] Date of Patent: Nov. 5, 1991

[54] OPTICAL TIME DOMAIN REFLECTOMETER HAVING PRE AND POST FRONT PANEL CONNECTOR TESTING CAPABILITIES

[75] Inventor: Glenn Bateman, Redmond, Oreg.

[73] Assignee: Tektronix, Inc., Beaverton, Oreg.

[21] Appl. No.: 514,070

[22] Filed: Apr. 25, 1990

[51] Int. Cl.⁵ .............................................. G01N 21/88
[52] U.S. Cl. ............................... 356/73.1; 250/227.15
[58] Field of Search .................... 356/73.1; 250/227.15

[56] References Cited

U.S. PATENT DOCUMENTS 4,673,299 6/1987 Dakin .............................. 356/73.1 X

FOREIGN PATENT DOCUMENTS 63-85327   4/1988  Japan .................................. 356/73.1
63-290934 11/1988  Japan .................................. 356/73.1
2190264   11/1987  United Kingdom ............... 356/73.1

Primary Examiner—Vincent P. McGraw
Attorney, Agent, or Firm—William K. Bucher

[57] ABSTRACT

An improved optical time domain reflectometer, OTDR, has a reference fiber interposed between an optical coupler and a front panel connector for acquiring a reference backscatter level that is independent from a fiber under test. The reference level is used to determine the quality of the front panel connection between the OTDR and the fiber under test and for verifying and adjusting transmitter and receiver circuitry in the OTDR. The reference fiber also allows the acquisition of front panel connector reflection data when a Bragg Cell is used as the optical coupler.

5 Claims, 1 Drawing Sheet

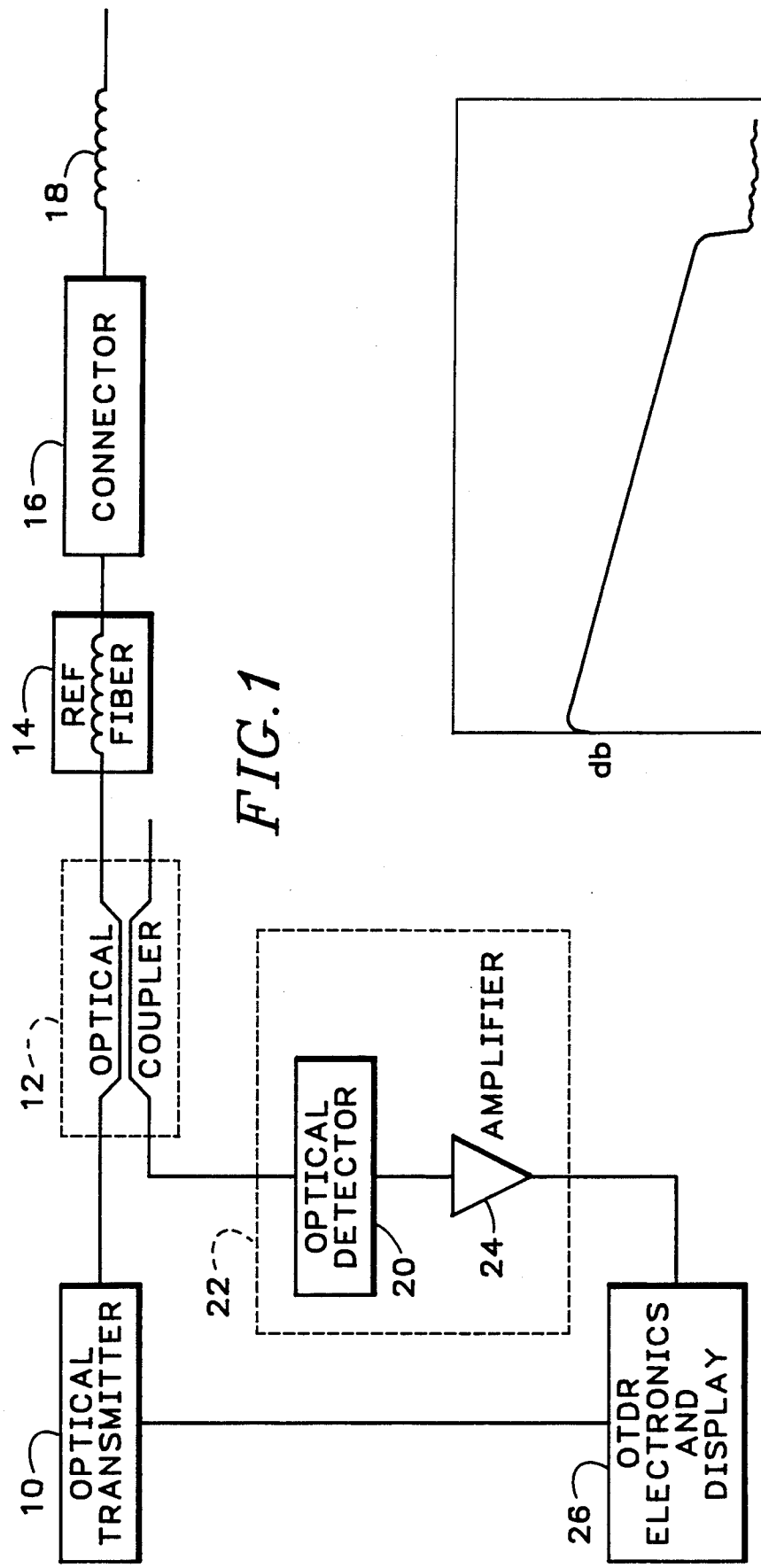

OPTICAL TIME DOMAIN REFLECTOMETER HAVING PRE AND POST FRONT PANEL CONNECTOR TESTING CAPABILITIES

BACKGROUND OF THE INVENTION

The present invention relates to optical time domain reflectometry and more specifically to an optical time domain reflectometer having pre and post front panel connector fiber testing capabilities.

Optical time domain reflectometers, OTDR, are used for testing optical transmission lines, such as fiber optic cables and the like, for discontinuities and faults, which affect the quality of optical signals transmitted through the fiber. In testing an optical fiber with an OTDR, the fiber under test is connected to a front panel connector and optical pulses from a laser are launched into the fiber. During the interval between the pulses, backscattered light from the fiber produced by the Rayleigh effect is directed to a photosensitive detector, such as a avalanche photodiode or the like, in the optical receiver of the OTDR. The detector converts the backscattered light signal into an electrical signal, which is amplified, sampled and displayed on an output device.

Improper alignment of the fiber under test in the front panel connector significantly reduces the amount of optical power launched into the fiber and the amount of Rayleigh backscattering returning from the fiber. One method of testing the front panel connection is to compare the optical power from the fiber with a reference value. If the power falls below the reference value, then the connector is considered faulty. However, this type of test can be inaccurate. For example, low optical power output from the laser would produce the same results as a faulting front panel connection.

Another method is used in the Model MW910A OTDR manufactured by Hitachi, Corp., Tokyo, Japan. The OTDR is provided with a light emitting diode, LED, output having a known power level at the back of the instrument. The output from the LED is coupled to the front panel connector of the OTDR via a fiber optic jumper cable. The LED input is displayed on the OTDR and a determination is made as to the quality of the front panel connection. This test, however, will not guarantee that the fiber under test connection will not be faulty.

Many OTDR's use optical modulators, such as a Bragg Cell, as optical couplers for selectively connecting the laser output to the fiber under test and for coupling the backscattered light from the fiber to the optical receiver. When the Bragg Cell switched to the laser output position, the optical receiver is blocked from receiving the backscattered light from the fiber. This characteristic of the Bragg Cell is useful in masking the high amplitude return reflections from the fiber under test caused by fiber splices and connectors, which overdrive the optical detector producing an output electrical pulse that has an approximately exponential decaying trailing edge due to the storage time of the detector. The detector storage effect produces a characteristic detector diffusion tail in the displayed reflected signal. By blocking the high amplitude return reflections, events that would be hidden by the detector tail may be examined. However, using the Bragg Cell as the optical coupler prevents the acquisition of data on the reflection associated with the front panel connector due to the time delay caused by the Bragg Cell having to stay in the laser output position until the transmitted pulse has passed through the cell. This time delay masks the optical receiver from the front panel connector reflection and a portion of the backscatter from the fiber under test.

What is needed is an OTDR that establishes a pre-front panel connector reference level for accurately determining the status of the transmitting and receiving circuitry in the OTDR and the quality of the front panel connection and can acquire front panel connector reflection data when using a Bragg Cell as an optical coupler.

SUMMARY OF THE INVENTION

According the present invention is an improved optical time domain reflectometer having a reference optical fiber interposed between a front panel connector and an optical coupler that is connected to an optical transmitter and an optical receiver. The optical transmitter generates a pulsed optical output that is coupled through the coupler and the reference fiber to a front panel connector and into a fiber under test. The optical receiver has a photodiode that receives backscattered light from a fiber under test through the reference fiber and the optical coupler. The reference fiber in the OTDR permits fiber testing prior and subsequent to the front panel connector.

The backscattered light from the reference fiber in the OTDR is sampled to establish a reference level that is compared to the sampled backscattered light from the fiber under test for determining the loss associated with the front panel connector to ascertain a faulty connection with the fiber under test. The reference level is also used during the OTDR self-diagnostics for determining the operating conditions of the transmitter and receiver circuitry and may be used for adjusting these circuits to maintain proper OTDR operation.

The front panel connector generates a high amplitude return reflection that is not detected in OTDR's using an optical modulator as the optical coupler. The reference fiber in the OTDR permits the acquisition of data on the front panel connector reflection as well as permitting a masking function to be performed on the return reflection allowing examination of the fiber under test near the connector.

The objects, advantages and novel features of the present invention are apparent from the following detailed description when read in conjunction with the appended claims and attached drawings.

BRIEF DESCRIPTION OF THE DRAWINGS

FIG. 1 is a block diagram of an improved optical time domain reflectometer incorporating the reference fiber of the present invention.

FIG. 2 is a typical OTDR display of acquired backscatter data from a fiber under test where a Bragg Cell is used as the optical coupler.

DESCRIPTION OF THE PREFERRED EMBODIMENT

Referring to FIG. 1, there is shown a block diagram of an improved optical time domain reflectometer, OTDR, of the present invention. The OTDR has an optical transmitter 10, such as a single mode or multi-mode laser, for generating optical pulses that are launched into a fiber under test 18. The output of the laser 10 is coupled through an optical coupler 12 to a reference optical fiber 14 that is either a single mode fiber or a multimode fiber. The reference fiber 14 is connected to a front panel connector 16 on the OTDR. The fiber under test 18 is connected to the front panel connector 16. The fiber under test 18 receives the optical pulses generated by the optical transmitter 10 and generates backscattered return reflected light that is coupled through the front panel connector, 16, the reference fiber 14, and the optical coupler 12 to an optical detector 20 in the optical receiver 22. The optical detector 20 converts the return reflected light to an electrical signal. The electrical signal is amplified by optical receiver amplifier 24 and sampled by data acquisition circuitry in the OTDR electronics and display circuitry 26 to generate data that is processed and displayed on a display output (not shown). The OTDR coupler 12 in the preferred embodiment is a Bragg Cell that couples the laser light to the front panel connector 16 while blocking light coming from the fiber under test 18 in one state and couples the light coming from the fiber under test 16 to the optical detector 20 in the other state.

The reference optical fiber 14 in the OTDR permits the establishment of a backscatter reference level that is independent of the fiber under test 18. Backscattered light from the reference fiber 14 is converted to an electrical signal and amplified by the optical receiver 22 and sampled by the OTDR electronics 26 producing the backscatter reference data. This data is compared with backscatter data acquired from the fiber under test to determine the loss associated with the front panel connector 16 to ascertain the quality of the fiber under test connection with the OTDR. In addition, the backscatter reference data is used during OTDR self-diagnostic tests for verifying the operating conditions of the transmitting and receiving circuits of the OTDR. During initial factory calibration of the OTDR, the backscatter reference level is measured and permanently stored in the instrument. Each time the OTDR is turned on, the self-diagnostic tests built into the OTDR measures the reference backscatter and compares the results with the initial factory data to determine the current operating conditions of the transmitter and receiver circuits. Any deviation from the factory data may be compensated for by automatically adjusting the transmitter and receiver circuitry, such as the gain stages in the receiver.

FIG. 2 shows a typical prior art OTDR display of acquired backscatter data from a fiber under test where a Bragg Cell is used as the optical coupler. The vertical axis is in dB and the horizontal axis in feet or meters. On the left side of the display is a rising signal level where the front panel connector reflection pulse should be. This loss or hole in the data is caused by the Bragg Cell blocking the backscattered light to the optical detector 20 while the optical pulse is transmitted. The signal level rises to the backscatter signal level of the fiber under test as the Bragg Cell switches to the detector 20. Inserting the reference fiber 14 prior to the front panel connector 16 provides the necessary time delay for switching the Bragg Cell from the transmission mode to the detector mode before the return reflection pulse from the front panel connector reaches the cell. This permits the acquisition of data on the front panel connector reflection pulse.

The minimum length of the reference fiber 1 is dependent on the pulse width of the transmitted pulse. The minimum length of the reference fiber 14 needs to be at least as long as the pulse width of the transmitted optical pulse from the laser 10. In the preferred embodiment, the length of the reference fiber is 100 meters based on a maximum transmitted pulse of 50 meters or 500 nsec based on a round trip propagation time of light through the fiber of 10 nsec/meter. A 50 meter pulse width provides suitable return backscatter levels from the fiber under test 18 without sacrificing the resolution of the OTDR. The optical pulse passes through the Bragg Cell and the reference fiber 14 to the front panel connector 16 where a return reflected pulse is generated and sent back along the reference fiber 14. The time period between the end of the transmission pulse and the start of the reflection pulse at the Bragg Cell is 500 nsec. During this time period, the Cell switches from allowing the transmitted pulse to pass, which blocks the optical receiver 22, to allowing light to pass into the optical receiver 22. With the reflected light passing into the receiver 22, data is acquired on the front panel connector reflection pulse. A masking techniques, described in co-pending U.S. Pat. application Ser. No. 07/515,792, filed Apr. 27, 1990 by Jeffrey Goll et.al., entitled "Signal Acquisition Method and Automatic Masking System for an OTDR" may be used for reducing the detector diffusion tail in the front panel connector reflection pulse to detect discontinuities that are hidden in the detector diffusion tail.

An improved optical time domain reflectometer has been described where a reference fiber is interposed between the optical coupler and the front panel connector for acquiring a reference backscatter level that is independent from the fiber under test. The reference level is used to determine the quality of the front panel connection between the OTDR and the fiber under test and for verifying and adjusting the transmitter and receiver circuitry in the OTDR. The reference fiber also allows the acquisition of front panel connector reflection data when a Bragg Cell is used as the optical coupler. These and other aspects of the present invention are set forth in the appended claims.

I claim:

1. An improved optical time domain reflectometer having an optical transmitter and receiver coupled to a front panel connector via an optical coupler, the transmitter launching optical pulses into a fiber under test connected to the front panel connector and the optical receiver receiving backscattered light from the fiber that includes a reflective pulse from the front panel connector, the improvement comprising a reference optical fiber interposed between the optical coupler and the front panel connector having a length that is a function of the pulse width of the launched optical pulses permitting the acquisition of a reference backscatter level prior to the front panel connector for comparing with the backscattered light from the fiber under test to determine a loss for the front panel connection and acquisition of data representative of the front panel connector reflective pulse.

2. The improved optical time domain reflectometer as recited in claim 1 wherein the reference backscatter level acquired from the reference fiber is used for determining the operating condition of the optical transmitter and receiver.

3. The improved optical time domain reflectometer as recited in claim 1 wherein the reference backscatter level acquired from the reference fiber is used for adjusting the operating conditions of the optical transmitter and receiver.

4. The improved optical time domain reflectometer as recited in claim 1 wherein the reference fiber is a single mode optical fiber.

5. The improved optical time domain reflectometer as recited in claim 1 wherein the reference fiber is a multimode optical fiber.

* * * * *